United States Patent [19]

Paradis

[11] Patent Number: 4,553,276
[45] Date of Patent: Nov. 19, 1985

[54] SECTIONAL MODULAR SHOWER CABINETS AND METHOD AND APPARATUS FOR MAKING AND INSTALLING THEM

[75] Inventor: Robert C. Paradis, Orillia, Canada

[73] Assignee: Fiat Products Incorporated, Monroe, Ohio

[21] Appl. No.: 473,587

[22] Filed: Mar. 9, 1983

[51] Int. Cl.$^4$ ............................................. A47K 3/22
[52] U.S. Cl. ........................................ 4/612; 4/614;
4/596; 52/35; 52/79.1; 52/270; 52/127.1
[58] Field of Search ................. 4/596, 597, 599, 600,
4/612–614, 584, 460, 524, 661; 52/79.7, 466,
468, 79.1, 35, 34, 270, 127.1; 156/71, 91, 304.2

[56] References Cited

U.S. PATENT DOCUMENTS

| | | | |
|---|---|---|---|
| 351,103 | 10/1886 | French | 4/594 |
| 1,913,066 | 6/1933 | Carter | 52/270 |
| 2,065,531 | 12/1936 | Kerr | 4/146 |
| 2,220,482 | 11/1940 | Fuller | 52/34 |
| 2,293,569 | 8/1942 | Sonino | 52/270 X |
| 2,533,591 | 12/1950 | LaBarre | 52/35 |
| 2,967,309 | 1/1961 | Corp | 52/35 |
| 2,993,212 | 7/1961 | Ruhm | 52/34 |
| 3,149,347 | 9/1964 | Embroden | 52/262 |
| 3,382,635 | 5/1968 | O'Gara et al. | 52/270 |
| 3,533,200 | 10/1970 | Zoebelein | 52/35 |
| 3,588,925 | 6/1971 | Kuypers et al. | 4/595 |
| 3,605,352 | 9/1971 | Ruggles et al. | 52/35 |
| 3,667,177 | 6/1972 | Biela | 52/278 |
| 3,827,086 | 8/1974 | Seymour et al. | 4/278 |
| 3,835,480 | 9/1974 | Harding | 52/79.7 X |
| 4,067,155 | 1/1978 | Ruff et al. | 52/466 X |
| 4,080,710 | 3/1978 | Hess | 29/416 |
| 4,241,552 | 12/1980 | Marulic | 52/466 x |
| 4,299,064 | 11/1981 | Daniels | 52/35 |
| 4,384,377 | 5/1983 | Calvert et al. | 4/614 |
| 4,406,556 | 9/1983 | Stahlberg | 52/466 X |

Primary Examiner—Henry K. Artis
Attorney, Agent, or Firm—Willian Brinks Olds Hofer Gilson & Lione

[57] ABSTRACT

A sectional modular shower cabinet is disclosed wherein a plurality of sections is held together by joining strips adhering to the rear faces of the sections. A waterproof sealant overlies the junctions between the sections of the shower cabinet. The installation of a sectional shower cabinet is also disclosed. The shower cabinet is assembled in the alcove at the final installation site. Adhesives are applied to the joining strips. The strips are temporarily clamped to the sections from the front of the cabinet while the adhesive sets.

An apparatus for making a sectional modular shower cabinet is disclosed wherein at least one saw is aligned perpendicular to the axis of rotation of a jig for rotating a modular shower cabinet.

11 Claims, 11 Drawing Figures

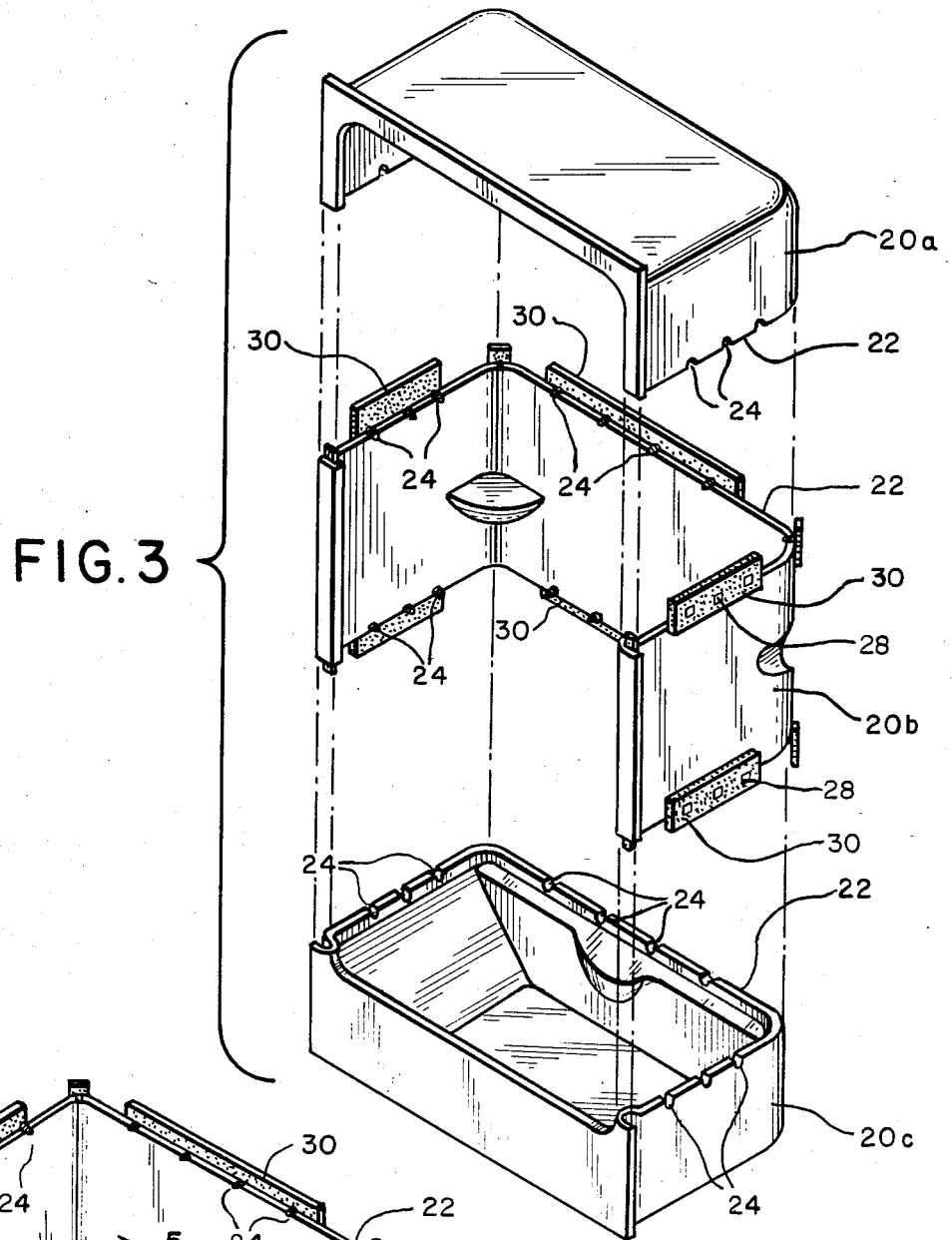
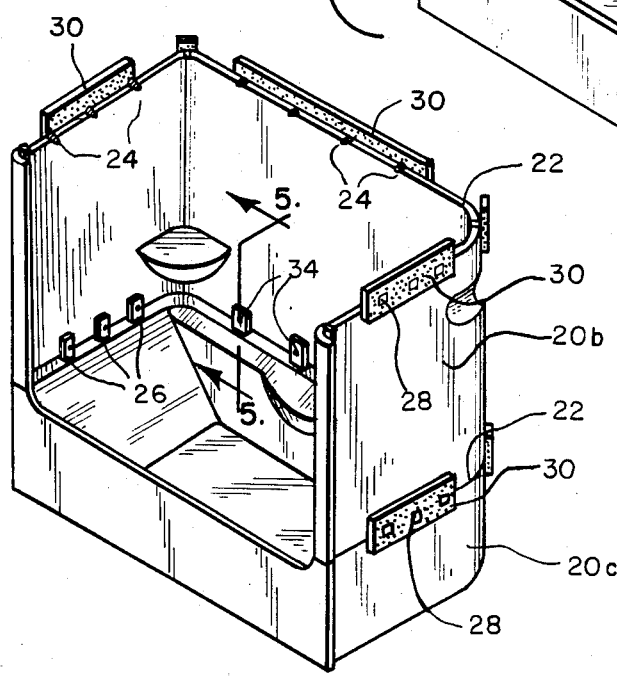
FIG. 3
FIG. 4

SECTIONAL MODULAR SHOWER CABINETS AND METHOD AND APPARATUS FOR MAKING AND INSTALLING THEM

BACKGROUND OF THE INVENTION

This invention relates to sectional modular shower cabinets, including shower-tub combinations and shower stalls for easy installation into already existing homes. Modular shower cabinets are one-piece plastic cabinets which are often used in the construction of new homes because of their simplicity and attractiveness. Sectional modular shower cabinets are delivered to a home in several sections for installation. When installed, the sectional modular shower cabinets provide the same attractive appearance as that of the modular shower cabinets.

As the number of new homes being built is decreasing, more existing buildings and homes are being renovated. During renovation, replacement of the shower cabinet can be very difficult because of its huge size. It is not possible to maneuver a modular shower cabinet through the doors of the bathroom and past the other bathroom fixtures into the alcove set aside for the cabinet.

One solution has been the use of knock-down shower cabinets. These are generally made of three metal wall pieces and a floor. They are less attractive than the modular shower cabinets and therefore are not as suitable for a main bathroom in a home.

To meet the need for an attractive shower cabinet which can be installed in an existing bathroom, manufacturers are providing sectional modular shower cabinets which are sold in several sections. Each section must be able to fit through a standard doorway. Once the size constraints have been met, the problems of installation must be faced. Difficulties are encountered in holding the several sections of the cabinet together. It is undesirable to have clamps or hardware on the inside of the cabinet. Any such protrusions from the wall of the shower would be unsightly, as well as possibly dangerous to a person bathing in the cabinet. As a result, the sections of the shower cabinet are generally connected on their outer surface. Bolts or clamps would be used to connect the various sections of the cabinet together. Unfortunately, this creates a problem in the installation of these sectional modular units. A person would have to get behind the cabinet to tighten the clamps. Thus, the cabinet cannot be assembled within its final alcove. It may be difficult to find enough space in the bathroom to perform this type of assembly. After the assembly, the cabinet must be lifted and moved into the alcove. This is another difficult operation. Moving puts great strain on the joints and can destroy the quality of the entire assembly. The sections might shift out of alignment.

This invention overcomes the problems caused by this difficult installation procedure. An object of this invention is to provide a sectional modular shower cabinet which can be assembled from the front of the cabinet. Consequently, this invention provides a sectional modular shower cabinet which can be assembled while it is in its alcove at the final installation site. There is no need to move the shower cabinet of the present invention after it is assembled. It is a further object of this invention to provide a sectional modular shower cabinet with rigidly bonded joints for holding the sections in alignment.

The present invention also relates to an apparatus and method for producing sectional modular shower cabinets. An apparatus was needed which could accurately cut straight lines through a modular shower cabinet to divide it into sections. Since the shower cabinet has a rounded contour, a regular table saw cannot be used to cut through the cabinet. It is an object of the present invention to provide an apparatus for cutting two straight lines through the rounded contour of the modular shower cabinet.

SUMMARY OF THE INVENTION

This invention is directed to a sectional modular shower cabinet and the method and apparatus for making and installing such a cabinet. The shower cabinet of the present invention is made of a plurality of sections which are connected by joining strips bonded to the outer surfaces of the sections by an adhesive. A waterproof sealant is spread along the junction between the sections to make the inside of the cabinet waterproof. The apparatus for making the sectional shower cabinet of the present invention includes a rotatable jig onto which a modular shower cabinet is clamped and cutting saws aligned with said jig for accurately making the cuts through the shower cabinet to divide it into the plurality of sections.

An advantage of the invention is that the assembly of the sectional shower cabinet at the installation site is performed from the front of the cabinet. Adhesive is applied to the joining strips which have been previously bonded to one of the cabinet sections. Adjacent sections are placed over one another. Then screws may be fastened through the front of the cabinet to apply pressure between the joining strips and rear of the sections while the adhesive is setting. After the adhesive bond is secured, the screws can be removed and the junction between the adjacent sections can be filled with a waterproof sealant. A vinyl strip covers the junction to provide an aesthetically pleasing final product. Since the assembly is done from the front of the cabinet there is no need now to move the cabinet. The assembly takes place within the cabinet's alcove avoiding the unnecessary strains placed on the joints if moving the assembled cabinet. The bonded joining strips provide strong joints which are rigidly held in alignment.

Other objects and advantages of the invention will become apparent during the following description of the presently preferred embodiments of the invention taken in conjunction with the drawings.

BRIEF DESCRIPTION OF THE DRAWINGS

FIG. 3 is an exploded view of the shower cabinet shown in FIG. 1.

FIG. 4 is a perspective view of a partially assembled shower cabinet of the present invention.

DETAILED DESCRIPTION

SECTIONAL SHOWER CABINET

Figure 1:
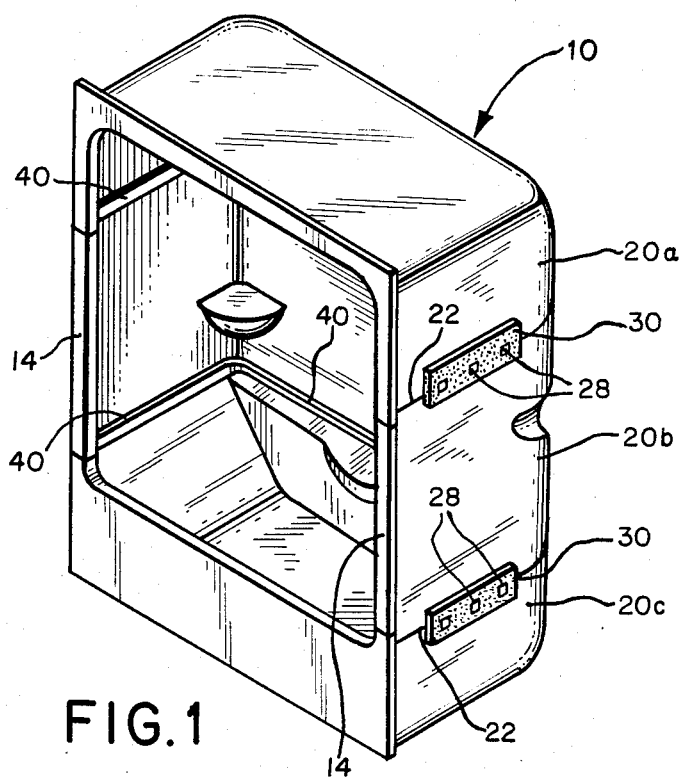
FIG. 1 is a perspective view of the assembled shower cabinet of the present invention.

Turning now to the drawings, FIG. 1 is an assembled shower cabinet 10 of the present invention. The cabinet shown includes a bathtub, however, this invention may be used for a shower stall as well as a shower-tub combination. The inner surface of the cabinet is made of a waterproof plastic, acrylic is presently preferred. On the outside of the cabinet is a layer of fiberglass backing, about ¼ to ⅜ inches in thickness.

Figure 2:
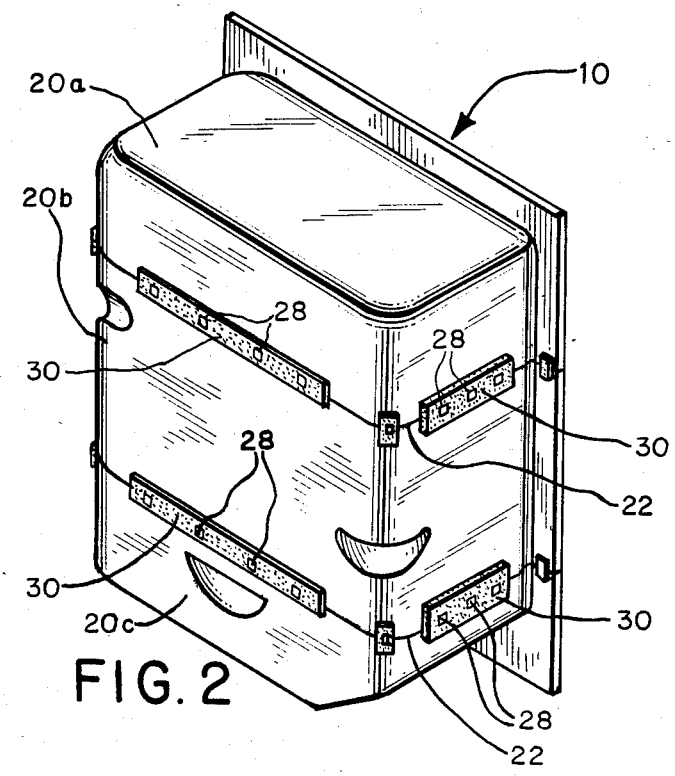
FIG. 2 is a perspective view of the rear of the assembled shower cabinet of the present invention.

In the preferred embodiment shown in the figures, the shower cabinet is made of three sections 20. See FIG. 3. However, a sectional modular shower cabinet of the present invention can be made of two or more sections. The sections 20 are stacked in vertical alignment to form the cabinet. Adjacent sections 20 meet at horizontal junctions 22. The two top sections could be cut to meet at a vertical junction, but the horizontal junction is preferred since it requires only vertical alignment of the sections. If there was a vertical junction, both vertical and horizontal alignment would be necessary. Besides, it is easier to make a sectional cabinet by cutting parallel lines through a modular cabinet rather than varying the direction of the cuts. Referring now to FIG. 2, plywood joining strips 30 are bonded to the sections across each junction 22 on the rear side of the cabinet. The joining strips 30 provide the strength necessary to rigidly hold the sections together and in vertical alignment.

Figures 5, 6:
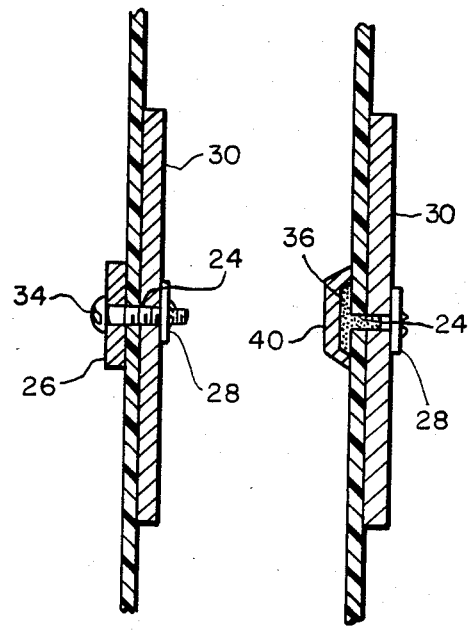
FIG. 5 is a cross-sectional view of the junction between two modules during assembly of the shower cabinet of the present invention.
FIG. 6 is a cross-sectional view of the junction between two modules in the assembled shower cabinet of the present invention.

FIG. 6 is a cross-sectional view of a junction 22 in the assembled product. On the front waterproof surface of the cabinet the junctions 22 are filled with a clear silicone sealant 36. The silicone 36 serves the purpose of making the joints waterproof and also acts as an adhesive to bond elongated vinyl strips 40 in place over the junctions 22. The vinyl strips 40 are vinyl extrusions. The strips 40 are color coordinated with the acrylic interior of the shower cabinet to make the assembled product aesthetically attractive.

METHOD FOR MAKING SECTIONAL SHOWER CABINET

The shower cabinet of the present invention is not sold in its assembled form. Quite the contrary, one of the advantages of the invention is the ease of assembly at the installation site. The sectional modular shower cabinet is manufactured from a one-piece modular plastic shower cabinet which is cut into two or more sections. The preferred modular cabinet is made by vacuum forming acrylic in a mold. The appearance of the modular cabinet used in the commercial production of the sectional modular shower cabinet of FIG. 1 can best be seen in U.S. Design Pat. No. 223,608, the disclosure of which is incorporated by reference herein. The cabinet is a three-sided shower stall with a stile 14 extending from the front of the cabinet on either side of the stall. The stiles 14 will be attached flat against the studs of the bathroom wall to secure the cabinet in position. A fiberglass backing is sprayed onto the outer surface of the acrylic cabinet. Holes are drilled in the cabinet to accommodate the drain, showerhead and overflow.

The fabrication of the modular shower cabinet into the sectional modular cabinet is performed as follows. At the back corners of the cabinet, drill holes 24 are marked on the cut lines to be made through the modular cabinet to divide it into the sections 20. A 5/32 inch drill is used to drill the holes at each location. After the holes 24 in the back corners have been drilled, the modular cabinet can be cut into sections 20. The cutting apparatus developed for this purpose is described separately below. For this cutting operation, clamps 68 are used to secure the cabinet to a frame 60. The cabinet remains clamped to the frame 60 after the cutting so that joining strips 30 can be clamped to the cabinet to hold the sections 20 together. Joining strips 30 are clamped to the back corners by using screws 34 through the holes 24.

Figure 9A:
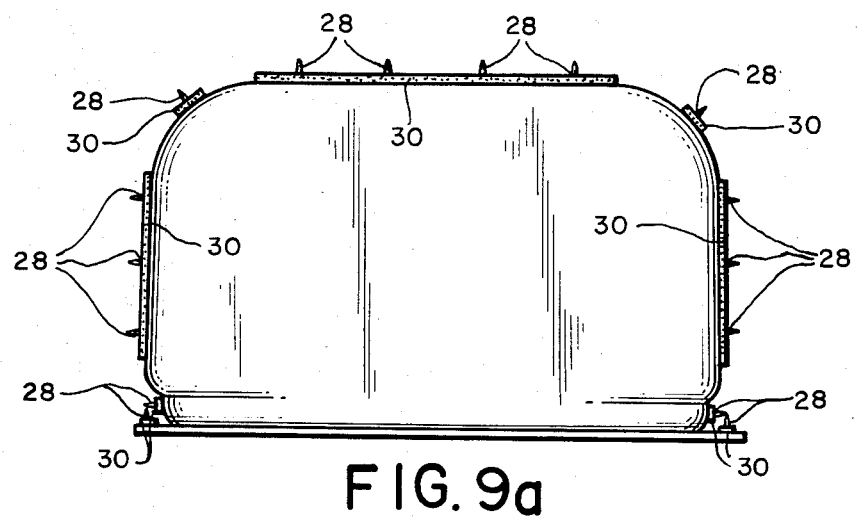
FIG. 9a is a plan view of the assembled shower cabinet of FIG. 1.
Figure 9B:
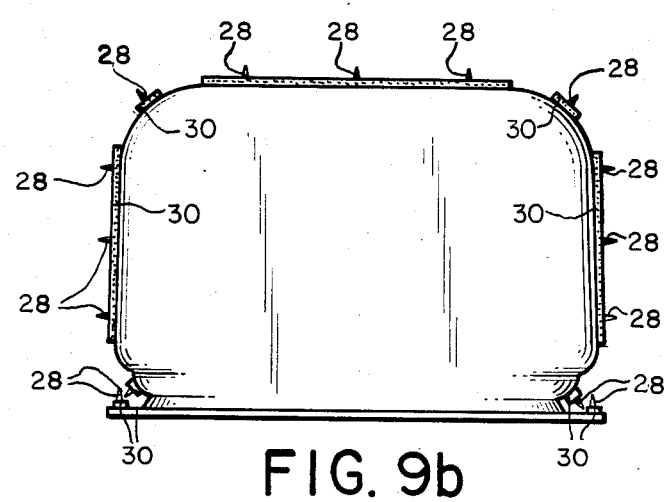
FIG. 9b is a plan view of a second embodiment of the assembled shower cabinet of the present invention.
Figure 9C:
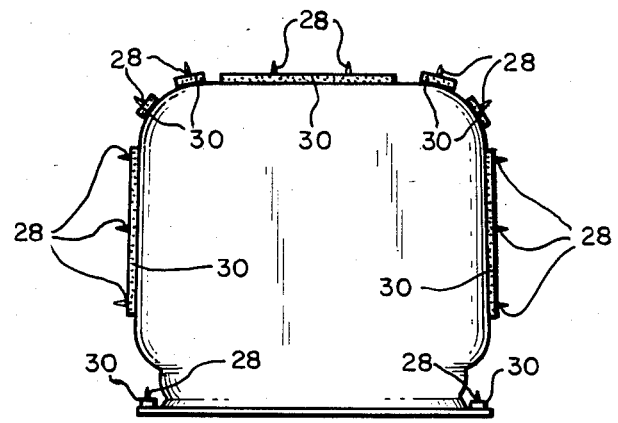
FIG. 9c is a plan view of a third embodiment of the assembled shower cabinet of the present invention.

After the back corner joining strips 30 have been clamped in place aligning the sections 20 of the cabinet, the remainder of the drill holes 24 must be located and drilled so that the remaining joining strips 30 can also be clamped in place. The location of the drill holes 24 can best be seen by referring to FIG. 9a. The drill holes 24 are drilled through the shower cabinet in alignment with clips 28 which will be described below. FIG. 9b shows the location of the clips 28 and thereby of the drill holes 24 and the placement of the joining strips 30 in a second embodiment of the present invention. The embodiment of FIG. 9b is a four foot wide shower stall. It does not include a tub. A third embodiment shown in FIG. 9c is a three foot wide shower stall.

The plywood boards used as joining strips 30 are preferably about four inches wide and have varying lengths. Along each cut line of the preferred embodiment shown in FIG. 9a, a 40 inch long board is used along the back of the cabinet, two 20 inch boards are used along the sides, two two-and-a-half inch long boards are put against the back corners of the cabinet and four one inch wide boards are placed around the front stiles 14. The location of the joining strips for alternate embodiments is shown in FIGS. 9b and 9c. Holes are drilled through the joining strips 30 in locations aligned with the drilled holes 24 in the sections 20. When the joining strips 30 are in place against the sections 20, screws 34 can be inserted through holes 24 into the holes in the joining strips 30. The holes in the joining strips 30 are about equal in diameter to the outer diameter of the screws 34.

Double faced adhesive tape is placed over the holes on the backside of the joining strips 30. Clips 28 are attached to the tape over the holes. The clips 28 act in a fashion similar to a nut at the end of a bolt. The presently preferred clips are Tinnerman clips. These are one-half inch by three-quarter inch pieces of spring steel. The clips 28 have a hole in their center approximately equal in diameter to the inner diameter of the threads of the screws 34. When the screws 34 are screwed into the clips 28, the clips clamp the joining strips 30 against the sections 20 being bonded to the strips.

An adhesive is needed for bonding the joining strips 30 to the sections 20. In the preferred embodiment, a polyester resin is mixed with chopped fiberglas fibers. Shortly before use, the resin mixture is combined with a catalyst, presently preferred is MEK (methylethyl ketone) peroxide. The resulting combination is applied to a portion of the joining strips 30. The joining strips 30 are put in position behind the drilled holes 24, aligning the holes in the joining strips 30 with the drilled holes 24 in the cabinet sections. The adhesive mixture is applied to half of each joining strip 30, so that each strip will adhere to only one of the sections 20. In the preferred embodiment, the joining strips 30 are all bonded to the middle section 20b.

The joining strips 30 must be clamped against the sections 20 to form a proper bond. The clamping means, as shown in FIG. 5, include a screw 34, a plastic plate 26 and the clip 28. The plastic plates 26 are placed over the drilled holes 24 against the front surface of the section 20. The plates 26 are rectangular 2×1 inch pieces of polypropylene wall material. This material has been chosen to avoid marring the waterproof acrylic surface of the sections 20. The plates 26 have a hole at their center for a screw to fit through. The screws 34 are screwed through the plates 26 and the drill holes 24 into the joining strips 30. The screws 34 tighten into the clips 28 at the back of the joining strips 30 to apply pressure between the joining strips 30 and the sections 20. Three-quarter inch long No. 8 screws are used for this purpose, in the preferred embodiment. The back corner joining strips 30 are clamped in place prior to the drilling of the holes 24 for the remaining clamps. The preferable sequence for clamping the remainder of the joining strips 30 is to first clamp the long back piece against the rear of the cabinet. This should be followed by moving outwards, clamping the side joining strips followed by the small joining strips around the stiles 14. After the strips have been secured along one junction 22, this sequence should be repeated along the other junction 22. Upon completing this placement of all the joining strips 30, the cabinet is separated from the frame 60 by removing the clamps 68.

The cabinet is allowed to stand for about a day so that the resin can cure. The unit is then ready for packaging. Two elongated vinyl strips 40, some resin mixture, a resin catalyst, a sanding block, some scrap pieces of plywood, sixteen 1½" wood screws and an instruction sheet are put into the package along with the cabinet. This set of accessories and temporarily assembled cabinet is then ready for delivery and installation.

APPARATUS FOR MAKING SECTIONAL SHOWER CABINET

Figure 7:
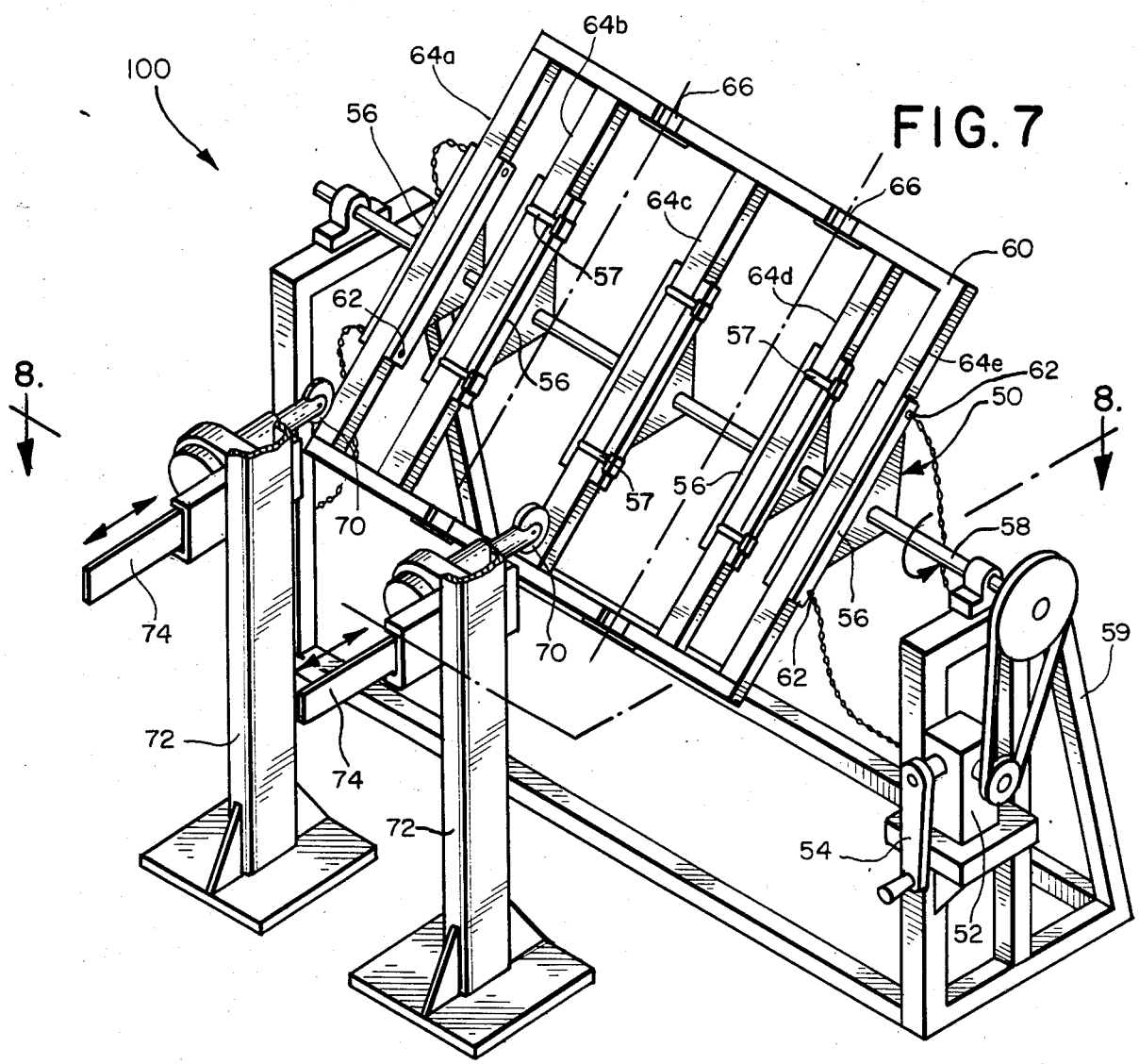
FIG. 7 is a perspective view of the cutting apparatus of the present invention for making a sectional shower cabinet.
Figure 8:
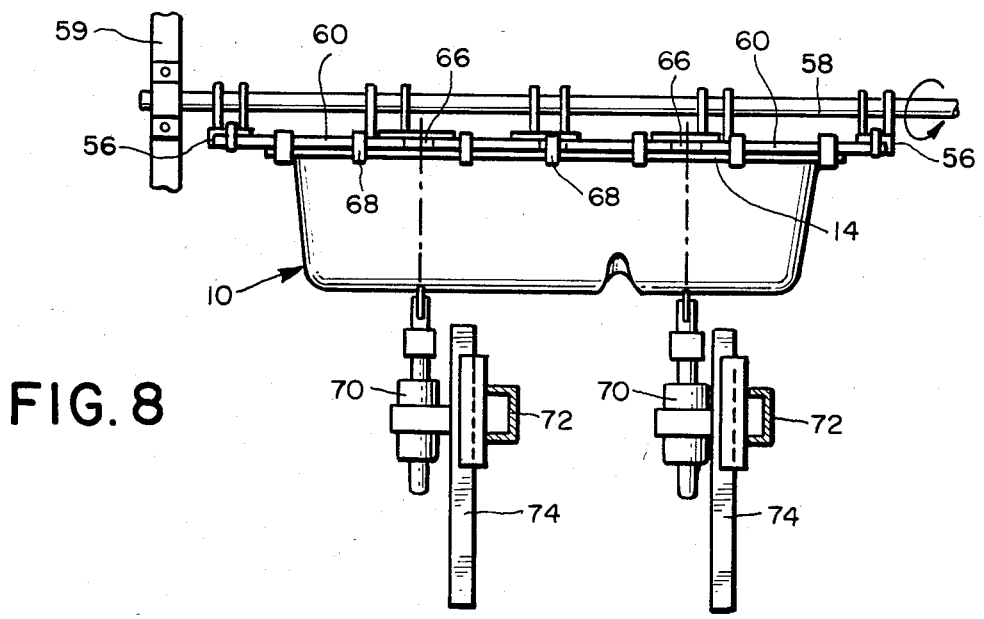
FIG. 8 is a plan view of the apparatus of FIG. 7.

Referring now to FIGS. 7 and 8, the cutting apparatus 100 for making a sectional shower cabinet is shown. The apparatus 100 includes a rotatable jig 50 upon which a frame 60 is mounted for rotation. During the cutting operation, a modular shower cabinet is clamped to the frame 60. The apparatus 100 also includes two saws 70 which are mounted for making the cut lines through the modular shower cabinet. The shower cabinet is not shown in FIG. 7 so that the jig 50 and frame 60 may be more easily viewed. The cabinet remains clamped to the frame 60 until the joining strips 30 have been glued and clamped to the sections 20 of the sectional shower cabinet.

The jig 50 includes U-shaped members 56 on a shaft 58. The shaft 58 is mounted for rotation on a base 59. The jig 50 is preferably made of steel. Rotation of the shaft 58 is controlled by a gear box 52. The gear box 52 is connected to the shaft 58 by means of two gear tooth pulleys joined by a chain link belt. The presently preferred gear box 52 provides a gearing ratio of 60 to 1.

The gear box 52 is shown in FIG. 7 with a manual crank 54. However, it would also be possible to use an electric motor and clutch to control the rotation of the gears.

The saws 70 are supported on stands 72. The saws 70 are attached on sliding bars 74 which slide toward or away from jig 50 in a line perpendicular to the axis of rotation of the jig 50. In the cutting operation, an operator will hold a saw 70 moving it in or out so that the saw will conform to the contour of the shower cabinet as it cuts a straight line. Since the saws 70 are attached to the sliding bars 74 a straight line is insured. In the preferred embodiment there are two saws 70, for making the two cut lines. It may be possible for the shower cabinets to be cut into any number of sections by using a different number of saws 70. The presently preferred saws 70 are Kett saws.

To cut a modular shower cabinet, it must be clamped to the frame 60. The frame 60 is preferably made of aluminum. The stiles 14 of the cabinet are clamped to the sides of the frame 60 with clamps 68. Series 441 clamps manufactured by De-Sta-Co are presently preferred for these clamps 68. It is preferable to use at least seven clamps along each stile 14 of the cabinet unit. After the cabinet has been clamped to the frame 60, the frame 60 is mounted in the jig 50. The shower cabinet and frame 60 are moved underneath the jig 50. Then they are lifted up so that the cross members 64 of the frame 60 fit into the U-shaped members 56 of the jig 50. Centering pins 62 are inserted through the U-shaped members 56 and the end cross members 64a, 64e of the frame 60. There are two centering pins 62 at each of the end U-shaped members 56. The pins properly position the frame 60 on the jig 50 and prevent the frame 60 from sliding in the U-shaped members 56. The center cross members 64b, 64c, 64d of the frame 60 are clamped to the jig 50 by clamps 57 which are mounted on the U-shaped members 56. Series 317 clamps manufactured by De-Sta-Co are presently preferred for these claims 57. There are two clamps 57 on each of the centered U-shaped members 64b, 64c, 64d. The sides of the frame 60 have channels 66 for allowing the saws 70 to make their cuts through the stiles 14 of the shower cabinet, without cutting into the frame 60.

When the cabinet has been mounted to the frame 60 and onto the jig 50, it may be cut into its sections 20. The jig 50 is caused to rotate. In the embodiment shown in FIG. 7, an operator turns the crank 54 to rotate the cabinet about the shaft 58. At each saw 70, an operator controls the position of the saw to conform to the contour of the shower cabinet as it is turned. This apparatus advantageously provides parallel straight line cuts through the irregular contour of the shower cabinet.

METHOD OF INSTALLING SECTIONAL SHOWER CABINET

At the installation site, the top section 20a is unclamped from the middle section 20b and it is removed from the unit. Likewise, the middle section 20b is unclamped from the bottom section 20c and removed. The bottom section 20c of the cabinet is moved into the alcove for the shower cabinet at the installation site. It should be noted that this is much easier than trying to move an entire shower cabinet. Shims are inserted under the bottom section 20c wherever necessary to make it level within the alcove. The middle section 20b is lifted onto the bottom section. The positions of the control valves for the plumbing are marked. The middle section 20b is removed and the holes are drilled.

An adhesive is applied with a spatula to the outer surface of the bottom section 20c in the portions where the joining strip 30 will contact the surface. The presently preferred adhesive is the polyester resin, fiberglass and peroxide catalyst combination, previously described. Since setting time varies for the resin mixture depending upon the amount of catalyst used and the temperature of the air, some mixture can be spread on a piece of scrap plywood. By checking the setting time on the scrap plywood, the setting time for the joining strips 30 can be estimated. The middle section 20b is then brought up and put in position over the bottom section 20c. To clamp the joining strips 30 against the sections 20 while the adhesive bonds, the plates 26 are replaced and the screws 34 are tightened with a screwdriver. The assembly at this stage is illustrated in FIG. 4. The sequence of clamping should be from the center of the back wall towards each side. All of this work is done from the front of the shower cabinet, while the cabinet sections are in their final installation site.

The front stiles 14 are screwed into the stud walls of the alcove. The steps followed for the middle section 20b are repeated for the top section 20a of the cabinet. The resin adhesive is applied, the top section 20a is put in place and the screws 34 are tightened against the plates 26. The stiles 14 on the top section are then screwed into the wall studs. The resin should be allowed to set overnight. When this is not possible, less time can be provided, using the mixture on the scrap plywood as a guide to the setting time. After the resin mixture has set, the plates 26 and screws 34 can be removed.

The junctions 22 between the sections 20 are sanded to roughen the acrylic surface. Referring now to FIG. 6, the junction 22 is caulked with a waterproof sealant 36, preferably silicone. The sealant 36 develops a surface skin within about 15 minutes after it is exposed to the air. Therefore, it is often easier to apply the vinyl strip 40 over the sealant 36 as the sealant 36 is being applied to the junction 22. Vertical strips of masking tape are applied over the vinyl strip 40 onto the cabinet surface to help insure a good bond between the sealant and the vinyl strip 40. After 24 hours of drying, the masking tape may be removed and the plumbing installation may be finished. It may also be desirable to cover the stiles 14 with a decorative molding to hide the wood screws used for securing the shower cabinet to the wall studs. The shower installation has been installed without any further need for moving the cabinet.

Of course, it should be understood that various changes and modifications to the preferred embodiment described above will be apparent to those skilled in the art. For example, the particular materials which can be used in the manufacture and installation of the modular shower cabinet are not limited to those mentioned in the above description. These and other changes can be made without departing from the spirit and scope of the invention and without diminishing its attendant advantages. It is therefore intended that such changes and modifications be covered by the following claims.

I claim:

1. A sectional modular shower cabinet comprising:
   a plurality of aligned cabinet sections, each having a rear surface and a waterproof front surface, said cabinet sections including a bottom section and at least one upper section, adjacent sections meeting along a junction;
   a plurality of joining strips positioned across each said junction, said joining strips adhering to portions of the rear surfaces of each of the adjacent cabinet sections, so that the adjacent cabinet sections are rigidly held in alignment;
   said joining strips being implemented from the front surface of said cabinet sections by partially removable clamping means; and
   a waterproof sealant filling each said junction to make the entire front surface of the cabinet waterproof.

2. The shower cabinet of claim 1 wherein said joining strips are formed of plywood.

3. The shower cabinet of claim 1 further comprising, adhesive between said joining strips and rear surfaces of said cabinet sections causing said strips to bond to said cabinet sections.

4. The shower cabinet of claim 3 wherein said adhesive comprises a combination of a polyester resin, fiberglass and a peroxide catalyst.

5. The shower cabinet of claim 1 wherein said bottom section includes a bathtub.

6. The shower cabinet of claim 1 wherein said plurality of cabinet sections comprises three vertically aligned cabinet sections, adjacent sections meeting along a horizontal junction.

7. The shower cabinet of claim 1 wherein said waterproof sealant is silicone.

8. The shower cabinet of claim 1 further comprising, an elongated vinyl strip overlying said junction.

9. A partially assembled sectional modular shower cabinet for installation in an alcove comprising:
   a plurality of vertically aligned cabinet sections each having an outside and an inside surface, adjacent sections meeting along a horizontal junction;
   a plurality of joining strips positioned across each of said junctions, said strips adhering to portions of the outside surface of each of the adjacent sections, so that adjacent cabinet sections are rigidly held in vertical alignment;
   clamping means for applying pressure between said joining strips and the respective sections being joined by said strips, said clamping means being implemented from the inside surface of said sections; and
   silicone sealant for filling each said horizontal junction to make the shower cabinet waterproof after assembly of all said cabinet sections.

10. A set of modular shower cabinet sections and accessories for installation in an alcove comprising:
    a plurality of shower cabinet sections, each having an outer surface and an inner waterproof surface, for stacking in vertical alignment to form a shower cabinet, adjacent shower cabinet sections adapted to form junctions where they meet;
    a plurality of joining strips for holding adjacent sections in vertical alignment across each said junction on the outer surface of adjacent sections;
    an adhesive for bonding said joining strips to the outer surfaces of adjacent sections;
    clamping means for applying pressure between said joining strips and the respective sections to be joined to said strips, said clamping means adapted to be implemented from the inner surface of said sections; and
    means for sealing the junctions formed between inner surfaces of adjacent sections after the joining strips are bonded to the sections.

11. The set of claim 10 further comprising a vinyl strip for placement on the inner waterproof surface over the junctions formed between adjacent sections.

* * * * *

UNITED STATES PATENT AND TRADEMARK OFFICE
CERTIFICATE OF CORRECTION

PATENT NO. : 4,553,276
DATED : November 19, 1985
INVENTOR(S) : Robert C. Paradis It is certified that error appears in the above-identified patent and that said Letters Patent is hereby corrected as shown below:

On the Title Page:

In the "References Cited", insert the following:

under "U.S. PATENT DOCUMENTS",

--D 223,608 5/1972 Lax . . . D23-49 --;

after "U.S. PATENT DOCUMENTS",

-- FOREIGN PATENT DOCUMENTS --

-- 2,024,910 6/1978 United Kingdom . . . E048-2/82 --

Signed and Sealed this

Seventh Day of April, 1987

Attest:

DONALD J. QUIGG

Attesting Officer

Commissioner of Patents and Trademarks